United States Patent
Schmidtler et al.

(10) Patent No.: US 11,409,869 B2
(45) Date of Patent: *Aug. 9, 2022

(54) AUTOMATIC THREAT DETECTION OF EXECUTABLE FILES BASED ON STATIC DATA ANALYSIS

(71) Applicant: Webroot Inc., Broomfield, CO (US)

(72) Inventors: Mauritius Schmidtler, Escondido, CA (US); Gaurav Dalal, San Jose, CA (US); Reza Yoosoofmiya, San Diego, CA (US)

(73) Assignee: Webroot Inc., Broomfield, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/791,649

(22) Filed: Feb. 14, 2020

(65) Prior Publication Data

US 2020/0184073 A1 Jun. 11, 2020

Related U.S. Application Data

(63) Continuation of application No. 14/709,875, filed on May 12, 2015, now Pat. No. 10,599,844.

(51) Int. Cl.
*G06F 21/56* (2013.01)
*G06N 5/04* (2006.01)
(Continued)

(52) U.S. Cl.
CPC .......... *G06F 21/565* (2013.01); *G06F 21/562* (2013.01); *G06N 20/00* (2019.01);
(Continued)

(58) Field of Classification Search
CPC ........ G06F 21/51; G06F 21/53; G06F 21/562; G06F 21/56; G06F 21/565; G06F 21/566;
(Continued)

(56) References Cited

U.S. PATENT DOCUMENTS 8,161,548 B1 * 4/2012 Wan ..................... G06K 9/6228
726/22
8,510,836 B1 * 8/2013 Nachenberg .......... H04L 63/145
726/23

(Continued)

OTHER PUBLICATIONS

Bai, Jinrong, Junfeng Wang, and Guozhong Zou. "A malware detection scheme based on mining format information." The Scientific World Journal 2014 (2014). (Year: 2014).*

(Continued)

*Primary Examiner* — Michael Simitoski
(74) *Attorney, Agent, or Firm* — Sprinkle IP Law Group

(57) ABSTRACT

Aspects of the present disclosure relate to threat detection of executable files. A plurality of static data points may be extracted from an executable file without decrypting or unpacking the executable file. The executable file may then be analyzed without decrypting or unpacking the executable file. Analysis of the executable file may comprise applying a classifier to the plurality of extracted static data points. The classifier may be trained from data comprising known malicious executable files, known benign executable files and known unwanted executable files. Based upon analysis of the executable file, a determination can be made as to whether the executable file is harmful.

59 Claims, 4 Drawing Sheets

(51) Int. Cl.
*G06N 20/10* (2019.01)
*G06N 20/00* (2019.01)
*G06F 11/30* (2006.01)
*G06F 8/53* (2018.01)

(52) U.S. Cl.
CPC .............. *G06N 20/10* (2019.01); *G06F 8/53* (2013.01); *G06F 2221/033* (2013.01)

(58) Field of Classification Search
CPC ..... G06F 2221/033; G06F 8/53; G06N 20/00; G06N 20/10; H04L 63/145
See application file for complete search history.

(56) References Cited

U.S. PATENT DOCUMENTS

| | | | |
|---|---|---|---|
| 8,719,924 B1 | 5/2014 | Williamson et al. | |
| 9,197,663 B1* | 11/2015 | Gilbert | G06F 21/552 |
| 9,465,940 B1* | 10/2016 | Wojnowicz | G06F 21/565 |
| 10,116,688 B1* | 10/2018 | Yun | H04L 63/145 |
| 10,599,844 B2 | 3/2020 | Schmidtler et al. | |
| 2006/0026675 A1* | 2/2006 | Cai | G06F 21/562 |
| | | | 726/22 |
| 2006/0037080 A1* | 2/2006 | Maloof | G06F 21/562 |
| | | | 726/24 |
| 2007/0240220 A1 | 10/2007 | Tuvell et al. | |
| 2009/0013405 A1* | 1/2009 | Schipka | G06F 21/562 |
| | | | 726/22 |
| 2009/0274376 A1* | 11/2009 | Selvaraj | G06K 9/6269 |
| | | | 382/224 |
| 2009/0300765 A1* | 12/2009 | Moskovitch | G06K 9/6256 |
| | | | 726/24 |
| 2010/0082642 A1* | 4/2010 | Forman | G06F 16/35 |
| | | | 707/749 |
| 2010/0192222 A1 | 7/2010 | Stokes et al. | |
| 2010/0293273 A1* | 11/2010 | Basarrate | H04L 61/2567 |
| | | | 709/224 |
| 2011/0154490 A1* | 6/2011 | DeLuca | G06F 21/56 |
| | | | 726/23 |
| 2011/0172504 A1* | 7/2011 | Wegerich | G16H 50/30 |
| | | | 600/301 |
| 2012/0079596 A1* | 3/2012 | Thomas | G06F 21/566 |
| | | | 726/24 |
| 2012/0227105 A1* | 9/2012 | Friedrichs | G06F 21/564 |
| | | | 726/22 |
| 2013/0291111 A1* | 10/2013 | Zhou | G06F 21/562 |
| | | | 726/23 |
| 2014/0165203 A1 | 6/2014 | Friedrichs et al. | |
| 2014/0310517 A1* | 10/2014 | Christodorescu | G06N 20/00 |
| | | | 713/160 |
| 2015/0213365 A1* | 7/2015 | Ideses | H04L 67/125 |
| | | | 706/12 |
| 2016/0021174 A1* | 1/2016 | De Los Santos Vilchez | H04W 12/128 |
| | | | 709/201 |
| 2016/0156646 A1* | 6/2016 | Hsueh | G06N 20/00 |
| | | | 726/1 |
| 2016/0225017 A1* | 8/2016 | Wong | G06Q 30/0247 |
| 2016/0335435 A1 | 11/2016 | Schmidtler et al. | |
| 2017/0262633 A1* | 9/2017 | Miserendino | G06F 21/564 |
| 2018/0365573 A1* | 12/2018 | Sultana | G06N 20/00 |

OTHER PUBLICATIONS

Office Action issued for U.S. Appl. No. 14/709,875, dated Dec. 8, 2016, 19 pages.
Shabtai et al., "Detection of Malicious Code by Applying Machine Learning Classifiers on Static Features: A State-of-the-Art Survery," Information Security Technical Report, Elsevier Advanced Technology, Amsterdam NL, vol. 14, No. 1, Feb. 1, 2009, pp. 16-29, XP026144093, ISSN: 1363-4127.
Office Action issued for U.S. Appl. No. 14/709,875, dated Mar. 24, 2017, 21 pages.
Office Action issued for U.S. Appl. No. 14/709,875, dated Apr. 20, 2018, 22 pages.
Office Action issued for U.S. Appl. No. 14/709,875, dated Jan. 24, 2019, 21 pages.
Office Action issued for U.S. Appl. No. 14/709,875, dated Jul. 17, 2019, 12 pages.
Bost, et al., "Machine learning classification over encrypted data." N DSS. vol. 4324. 2015. (Year: 2015), 14 pages.
Choi, et al., "Efficient Malicious Code Detection Using N-Gram Analysis and SVM," 2011 14th International Conference on Network-Based Information Systems. IEEE, 2011, 4 pages.
Devi, Dhruwajita et al., "Detection of Packed Malware," Proceedings of the First International Conference on Security of Internet ofThings, ACM, 2012, 5 pages.
Dube, et al., "Malware Target Recognition Via Static Heuristics," Computers & Security 31.1, 2012, 11 pages.
Merkel, et al., Statistical Detection of Malicious Pe-Executables for Fast Offline Analysis, IFIP International Conference on Communications and Multimedia Security, Springer, Berlin, 2010, 12 pages.
Singla, et al., "A Novel Approach to Malware Detection Using Static Classification," International Journal of Computer Science and Information Security 13.3, 2015, 5 pages.
Tabish, et al., "Malware Detection Using Statistical Analysis of Byte-Level File Content," Proceedings of the ACM SIGKDD Workshop on CyberSecurity and Intelligence Informatics, ACM, 2009, 9 pages.
Treadwell, et al., A Heuristic Approach for Detection of Obfuscated Malware, 2009 IEEE International Conference on Intelligence and Security Informatics, 2009, 9 pages.
Notice of Allowance issued for U.S. Appl. No. 14/709,875, dated Nov. 14, 2019, 11 pages.
Corrected Notice of Allowance issued for U.S. Appl. No. 14/709,875, dated Dec. 23, 2019, 8 pages.
Corrected Notice of Allowance issued for U.S. Appl. No. 14/709,875, dated Jan. 24, 2020, 8 pages.
International Patent Application No. PCT/US2016/032090, International Search Report and Written Opinion dated Jul. 29, 2016, 13 pages.
Perdisci et al., "Classification of Packed Executables for Accurate Computer Virus Detection," Pattern Recognition Letters 29, 2008, 6 pages.
Perdisci et al., "McBoost: Boosting Scalability in Malware Collection and Analysis Using Statistical Classification of Executables," Annual Computer Security Applications, 2008, 10 pages.
Khan, et al., "Determining Malicious Executable Distinguishing Attributes and Low-Complexity Detection", J. ComputVirol, 7.2 (2011), 11 pgs.
Kolter, et al., "Learning to Detect and Classift Malicious Executables in the Wild", Journal of Machine Learning Research 7 (2006), 24 pages.

* cited by examiner

300

AUTOMATIC THREAT DETECTION OF EXECUTABLE FILES BASED ON STATIC DATA ANALYSIS

CROSS-REFERENCE TO RELATED APPLICATION(S)

This application is a continuation of, and claims a benefit of priority from U.S. patent application Ser. No. 14/709,875, filed May 12, 2015, issued as U.S. Pat. No. 10,599,844, entitled "AUTOMATIC THREAT DETECTION OF EXECUTABLE FILES BASED ON STATIC DATA ANALYSIS," which is fully incorporated by reference herein.

BACKGROUND

Everyday new executable files are created and distributed across networks. A large portion of these distributed executable files are unknown. For instance, it is not known if such distributed executable files are malicious or not. Given the high volume of new unknown files distributed on a daily basis, it is important to determine threats contained in the set of new unknown files instantaneously and accurately. It is with respect to this general environment that aspects of the present technology disclosed herein have been contemplated.

SUMMARY

Aspects of the present disclosure relate to threat detection of executable files. A plurality of static data points are extracted from an executable file without decrypting or unpacking the executable file. The executable file may then be analyzed without decrypting or unpacking the executable file. Analyzing of the executable file comprises applying a classifier to the plurality of static data points extracted from the executable file. The classifier is trained from data comprising known malicious executable files, known benign executable files and potentially unwanted executable files. Based upon the analysis of the executable file, a determination is made as to whether the executable file is harmful. In some examples, execution of the executable file is prevented when a determined probability value that the executable file is harmful exceeds a threshold value.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following figures. As a note, the same number represents the same element or same type of element in all drawings.

Figure 1:
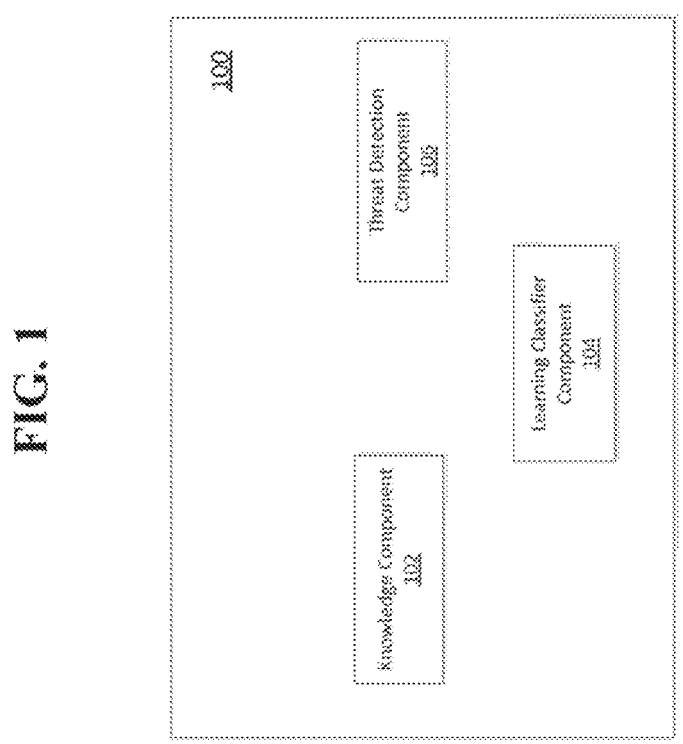
FIG. 1 illustrates an exemplary system 100 showing interaction of components for implementation threat detection as described herein.

Non-limiting examples of the present disclosure relate to the threat detection of executable files. The examples disclosed herein may also be employed to detect zero day threats from unknown executable files. However, one skilled in the art will recognize that the present disclosure is not limited to detection of executable files that may present zero day threats and can be applicable to any unknown file that is attempting to execute on a system (e.g., processing device). The present disclosure is able to detect whether an executable file is harmful or benign before the executable file is actually executed on a processing device. In examples, machine learning processing applies a classifier to evaluate an executable file based on static points data collected from the executable file. The classifier is trained from a collection of data comprising known malicious files, potentially unwanted files and benign files. The classifier is designed and trained such that it can handle encrypted and/or compressed files without decrypting and/or decompressing the files.

Approaches to detecting threats typically focus on finding malicious code blocks within a file and analyzing the behavior of the file. Such approaches are expensive and time-consuming operations that require decrypting encrypted files, dissembling code, analyzing behavior of malware, among other things. Additionally, behavioral detection requires the execution of the potentially malicious code, thereby presenting an opportunity for the malicious code to harm the computing system is executing on. The present disclosure achieves high and accurate classification rates for potentially malicious executables without the need to employ time consuming processing steps like decryption, unpacking or executing unknown files while maintaining a controlled and safe environment. The determination of unknown files is achieved by evaluating static data points extracted from an executable file using a trained classification system that is able to identify potential threats without analyzing executable behavior of a file. The present disclosure also provides for the creation of a training set that adaptively learns what static data points may indicate the existence of malicious code using training data that contains a statistically significant number of both encrypted and non-encrypted examples of malicious or unwanted executable files, among other information. By collecting a large set of training examples as they appear as publicly available and distributed over network connection (e.g., "in the wild"), the present disclosure ensures that its adaptive learning processing is robust enough to comprise sufficient representation of features (and distributions) from files that may be encrypted, not-encrypted, compressed, and uncompressed, among other examples.

A number of technical advantages are achieved based on the present disclosure including, but not limited to: enhanced security protection including automatic detection of threats, reduction or minimization of error rates in identification and marking of suspicious behavior or files (e.g., cut down on the number of false positives), ability to adapt over time to continuously and quickly detect new threats or potentially unwanted files/applications, improved efficiency in detection of malicious files, and improved usability and interaction for users by eliminating the need to continuously check for security threats, among other benefits that will be apparent to one of skill in the art.

FIG. 1 illustrates an exemplary system 100 showing an interaction of components for implementation threat detection as described herein. Exemplary system 100 may be a combination of interdependent components that interact to form an integrated whole for execution of threat detection and/or prevention operations. Components of the systems may be hardware components or software implemented on and/or executed by hardware components of the systems. In examples, system 100 may include any of hardware components (e.g., used to execute/run operating system (OS)), and software components (e.g., applications, application programming interfaces, modules, virtual machines, runtime libraries, etc.) running on hardware. In one example, an exemplary system 100 may provide an environment for software components to run, obey constraints set for operating, and/or makes use of resources or facilities of the system 100, where components may be software (e.g., application, program, module, etc.) running on one or more processing devices. For instance, threat detection operations (e.g., application, instructions, modules, etc.) may be run on a processing device such as a computer, a client device (e.g., mobile processing device, laptop, smartphone/phone, tablet, etc.) and/or any other electronic devices, where the components of the system may be executed on the processing device. In other examples, the components of systems disclosed herein may be spread across multiple devices. For instance, files to be evaluated may be present on a client device and information may be processed or accessed from other devices in a network such as, for example, one or more server devices that may be used to perform threat detection processing and/or evaluation a file before execution of the file by the client device.

As one example, system 100 comprises a knowledge component 102, a learning classifier component 104, and a threat determination component 106, each having one or more additional components. The scale of systems such as system 100 may vary and include more or less components than those described in FIG. 1. In alternative examples of system 100, interfacing between components of the system 100 may occur remotely, for example where threat detection processing is implemented on a first device (e.g., server) that remotely monitors and controls process flow for threat detection and prevention of a second processing device (e.g., client).

As an example, threat detection may detection exploits that are executable files. However, one skilled in the art will recognize that the descriptions herein referring to executable files are just an example. Threat detection examples described herein can relate to any computer file. In one example, an executable file may be a portable executable (PE) file that is a file format for executables, object code, dynamic link library files (DLLs), and font library files, among other examples. However, one skilled in the art will recognize that executable files are not limited to PE files and can be any file or program that executes a task according to an encoded instruction. Knowledge component 102 described herein may collect data for use in building, training and/or re-training a learning classifier to evaluate executable files. The knowledge component 102 is one or more storages, memories, and/or modules that continuously collects and manages data that may be used to detect threats in files such as executable files. In one example, the knowledge component 102 maintains a robust collection of data comprising known malicious executable files, known benign executable files, and potentially unwanted executable files. As an example, Malicious executable files may be any type of code, data, objects, instructions, etc., that may cause harm or alter an intended function of a system and/or any system resources (e.g., memory, processes, peripherals, etc.) and/or applications running on a device such as an operating system (OS). A benign executable file is a file that upon execution, will not cause harm/damage or alter an intended system function. In other examples, a benign executable may cause harm/damage or alter an intended system; however, the potential harm/damage or alteration may be acceptable to the owner of the system or device. In examples, potentially unwanted executable files are files that may be installed on system 100 that may not be malicious, but a user of the device may not want such a file to execute and/or a file that is executed/installed unknowingly to a user. In one example, classification of executable files as malicious, benign or potentially unwanted are done by research and development support associated with developments and programming of a threat detection application/module. However, one skilled in the art will recognize that identification and classification of files into the above identified categories may be done by monitoring or evaluating a plurality of resources including but not limited to: network data, executable file libraries and information on previously known malicious executable files as well as benign executable files and potentially unwanted executable files, users/customers of threat detection/computer security software, network flow observed from use of threat detection processing and products, business associations (e.g., other existing threat detection services or partners), third-party feeds, and updates from threat detection performed using learning classifier of present disclosure, among other examples.

To classify executable files into one of the above identified categories, the knowledge component 102 collects static data on a large variety of executable files (e.g., PE files). Examples of different types of executable files collected and evaluated include but are not limited to: bit files (e.g., 32/64 bit files), operating system files (e.g., Windows, Apple, Linux, Unix, etc.), custom built files (e.g., internal tool files), corrupted files, partial downloaded files, packed files, encrypted files, obfuscated files, third party driver files, manually manipulated binary files, unicode files, infected files, and/or memory snapshots, among other examples. The data collected and maintained by the knowledge component 102 yields a knowledgebase that may be used to periodically train a classifier, e.g. learning classifier component 104 utilized by system 100. The learning classifier component may be used to classify an executable file as one of the following classifications: malicious, benign or potentially unwanted. In some examples, classification may span two or more two or more of those classification categories. For example, an executable file may be benign in the sense that it is not harmful to system 100 but may also be classified as potentially unwanted as it might be installed without explicit user consent, for example. Data maintained by the knowledge component 102 may be continuously updated system 100 or a service that updates system 100 with new exploits to add to the training sample. For example, a research team may be employed to continuously collect new examples of harmful executables, benign executables, and potentially unwanted executables, as many unknown executable files are generated on a daily basis over the Internet. Executable files may be evaluated by the research team such as by applying applications or processing to evaluate executable files including data associated with the file and/or actions associated with the file (e.g., how it is installed and what a file does upon execution). Continuous update of the data maintained by the knowledge component 102 in conjunction with on-going re-learning/re-training of the learning classifier component 104 ensures that system 100 is up-to-date on current threats. Knowledge of the most current threats improves the generalization capability of system 100 to new unknown threats. By incorporating malicious files, benign files and potentially unwanted files, the present disclosure greatly improves a knowledge base that may be used to in training a learning classifier thereby resulting in more accurate classifications as compared with other knowledge bases that are based on only malicious and/or benign files.

In examples, the collected data on the executable files is analyzed to identify static data points that may indicate one of a malicious file, a benign file or a potentially unwanted file. For instance, the knowledge component 102 may employ one or more programming operations to identify static data points for collection, and to associate the static data points with one of the categories of files (e.g., malicious, benign or potentially unwanted). Programming operations utilized by the knowledge component 102 include operations to collect file data (e.g., executable files or data points from executable files), parse the file data, and store extracted data points. In at least one example, the knowledge component 102 comprises one or more components to manage file data. For example, the knowledge component 102 may comprise one or more storages such as databases, and one or more additional components (e.g., processors executing programs, applications, application programming interfaces (APIs), etc.).

Further, the knowledge component 102 may be configured to continuously collect data, generate a more robust collection of file data to improve classification of file data and train a classifier used to detect whether an executable file is harmful, benign, or potentially unwanted. The identification of static data points to be collected and analyzed for executable files may be continuously updated as more information becomes available to the knowledge component 102. A static data point may be a point of reference used to evaluate an executable file. As examples, static data points include, but are not limited to: header information, section information, import and export information, certificate information, resource information, string and flag information, legal information, comments, and/or program information (e.g., APIs and DLLs), among other examples. Static data points may be organized into categories that identify a type of static data point. Categories of static data points comprise, but are not limited to: numeric values, nominal values string sequences, byte sequences, and/or Boolean values, among other examples. Any number of static data points may be collected and analyzed for an executable file. In general, collecting and analyzing a greater number of static data points results in more accurate classification of an executable file. For example, eighty static data points may be identified and collected (or attempted to be collected) from an executable file during analysis of an executable file. While a specific number is static data points are provided herein, one of skill in the art will appreciate the more or fewer static data points may be collected without departing from the scope of this disclosure. As an example, the following table, Table 1.1, identifies some of the static data points identified for analysis of an executable file, where the static data points are organized by category:

TABLE 1.1

| Numeric values | Nominal values | Strings/Byte sequences | Boolean values |
| --- | --- | --- | --- |
| File size | initialize | Comments | Address Of Entry Point Anomaly |
| linker version | Un-initialize | company name | Image Base Anomaly |
| code size | entry point | file description | Section Alignment Anomaly |
| OS version | subsystem | internal name | Size Of Code Mismatch Anomaly |
| image version | file subtype | legal copyright | Low Import Count Anomaly |
| subsystem version | language | original file | Entry Point Anomaly |
| file version number | file flags masks | private build | certificate Validity |
| product version number | file flags | product name | Certificate Exception |
| size of heapr | file OS | special build | Code Characteristics Anomaly |
| size of stackr | file type | product version | Code Name Anomaly |
| size of image | machine type | file version | Count Anomaly |
| PE header time | PE type | package code | Data Characteristics Anomaly |
| Section Entropy | section counts | product code | Data Name Anomaly |
| Sections count | DLL count | export DLL name | Export Exception |
| | DLL functions | assembly version | Large Number of DLLs Anomaly |
| | data directory | Certificate Issuer | flag DLL Name Anomaly |
| | export count | Certificate Subject | Number of Functions Anomaly |
| | Earliest Data Byte | Imports | Function Name Anomaly |
| | resources | Exports | PE Header Anomaly |
| | resources language | Section Names | High Section Count Anomaly |
| | resource Encoding | Non-resource section strings | PE Magic Validity |
| | resource code page | | Resource Exception |
| | resource size | | VR Code Ratio Anomaly |
| | DLL characteristics | | Import Exception |

Examples of the present disclosure need not distinguish between encrypted files and non-encrypted files. The static data points may be extracted from files regardless of whether or not they are encrypted and/or compressed. Given that the training set contains a statistically significant number of encrypted and non-encrypted examples, as well as compressed and decompressed files, a learning classifier (e.g., learning classifier component 104) may be trained to identify features in the extracted data to identify malicious files. Since a very large majority of the files "in the wild" use few tools to encrypt the files (e.g., encryption algorithm, packers, etc.), the distribution of the data found across large number of files is preserved after encryption, although the actual content of the data is transformed into something different. By collecting a large set of training examples as they appear "in the wild", a sufficient representation of features and distributions associated with the represented features exist in a training set that are both encrypted and not-encrypted. The present disclosure provides at least one benefit over other threat detection applications/programs by utilizing a very large and diverse training sample, thereby enabling a more intelligent and adaptive learning classifier that is able to achieve high detection rates for threats and low false positive rates, among other benefits.

In addition to collecting and managing information to train a learning classifier, the knowledge component 102 is used to evaluate an executable file and extract/collect static data points for evaluation of the file by the learning classifier before the file is executed. In one example, the system automatically identifies a new file (e.g., unknown file) for evaluation. As examples, identification of an executable file for evaluation may occur in examples such as: when a download of a file is requested, while a download is being performed, evaluation of streaming data, when a new file is detected as attempting to execute (e.g., potentially unwanted file), and before an unknown file or file containing executable code that was not previously checked attempts to execute, among other examples. In another example, a user of a device with which components of system 100 are operating may identify a file to be evaluated. The knowledge component 102 collects as many static data points as it can to evaluate the executable file using a learning classifier built by the learning classifier component 102. In an exemplary extraction, the knowledge component 102 extracts each of the static data points identified in Table 1.1. The learning classifier component 102 intelligently builds a learning classifier to evaluate a file based on the extracted static data points of the file and the data managed by the knowledge component 102.

The learning classifier component 104 is a component used to evaluate an executable file using the information provided by the knowledge component 102. The learning classifier component 104 interfaces with the knowledge component 102 and a threat detection component 106 for the system 100 to evaluate an executable file as a possible threat. As an example, the learning classifier 104 applies programming operations or machine learning processing to evaluate static data points extracted from a file to be analyzed. In doing so, the learning classifier component 104 builds a learning classifier based on information from the knowledge component 102 including the extracted static data points of a file and the information used to train/re-train the learning classifier (e.g., static data on the robust collection of executable files including variety of file types of malicious executable files, benign executable files, and potentially unwanted executable files).

As an example, the learning classifier can adaptively set features of a learning classifier based on the static data points extracted for a file. For example, ranges of data can be identified for static data points that may enable the learning classifier to controllably select (e.g., turn on/off) features for evaluation by learning classifier. In one instance where a static data point extracted for evaluation is a file size (e.g., numeric value), the learning classifier may turn on/off features for evaluation based on whether a the file size of the file is within a certain range. In another example, the learning classifier may detect that the file does not contain "legal information" in the file. Legal information may be any identifying information indicating data that conveys rights to one or more parties including: timestamp data, licensing information, copyright information, indication of intellectual property protection, etc. In an example where the learning classifier detects the presence of legal information does not exist in the executable file, this may trigger the learning classifier to adaptively check for additional features that might be indicative of a threat or malicious file as well as turn off other features related to an evaluation of the "legal information." The learning classifier component 104 utilizes programming operations or machine-learning processing to train/re-train the learning classifier to uniquely evaluate any file/file type. One of skill in the art will appreciate different types of processing operations may be employed without departing from the spirit of this disclosure. For example, the learning classifier component 104 may utilize an artificial neural network (ANN), a decision tree, association rules, inductive logic, a support vector machine, clustering analysis, and Bayesian networks, among other examples.

The learning classifier component 104 processes and encodes collected/extracted data from a file to make the static data points suitable for processing operations. The processing and encoding executed by the learning classifier component 104 may vary depending on the identified categories and/or type (e.g., numeric values, nominal values, string/byte sequences, Boolean values, etc.) of static data points collected by the knowledge component 102. As an example, string sequence data as well as byte sequence data may be parsed and processed as n-grams and/or n-gram word prediction (e.g., word-grams). For instance, for a given string all unigrams, bigrams and so forth up to a given length n are generated and the counts of the individual n-grams are determined. The resulting counts of the unique n-grams string and/or byte sequences are then used as input to a generated feature vector. In one example, strings are processed directly according to a bag of word model. A bag of word model is a simplifying representation used in natural language processing and information retrieval. In another example, numeric value static data points may be binned appropriately ensuring a good balance between information loss through data binning and available statistics. Nominal values as well Boolean values may be encoded using true/false flags. All of the different encoded data may be combined into one or more final feature vectors, for example after a complex vector coding/processing is performed (e.g., L2 norm).

As an application example of processing performed by the learning classifier component 104, suppose extraction of static data points from a file identifies the following four (4) data points:

File size: 4982784
PEHeader Anomaly: False
Section name: .TEXT
Legal copyright: Copyright (C) Webroot Inc. 1997

Processing these 4 data points into a feature vector may require binning the file size, labeling the PE Header Anomaly, build n-grams for the section name and building word-gram for legal copyright. Encapsulation of special characters that sometimes appear in text (e.g., section names) may be desirable. In an example, strings of data may be transformed first into hex code representation and then build n-grams or word-grams. In this particular example, the section name is transformed into n-grams while the legal copyright text is transformed into word-grams. In evaluation using the classifier, the features related to the extracted data points may be weighted by the particular data point being evaluated or by category, for example. For instance, the training of the learning classifier may indicate that legal information (e.g., "legal copyright") provides a better indication that a file may be malicious than that of a section name. Features being evaluated (and their distributions) differ for benign files as compared to malicious files (e.g., harmful executables such as malware). For example, the data field "Legal Copyright" for benign files tends to have meaningful words, whereas in a malicious file, this data field is often left empty or it is filled with random characters. Commercial software files tend to have a valid certificate, whereas malware in general do not have valid certificates. Similarly, each data field for a static data point evaluated provides further indication about the maliciousness of the file. The combined information from all these data fields coupled with machine learning enables accurate prediction determination as to whether a file is malicious, benign or potentially unwanted. As an example, the resulting feature vector in sparse form is shown below:

```
secname_002e00740065:0.204124145232
secname_0065:0.0944911182523
secname_0074006500780074:0.353553390593
secname_006500780074:0.408248290464
secname_00740065:0.144337567297
secname_002e007400650078:0.353553390593
secname_00650078:0.144337567297
secname_002e0074:0.144337567297
secname_002e:0.0944911182523
secname_00780074:0.433012701892
secname_0078:0.0944911182523
secname_007400650078:0.204124145232
secname_0074:0.472455591262
legalcopyright_0043006f007000790072006900670068 0074:0.4472135955
legalcopyright_002800430029:0.4472135955
legalcopyright_0043006f00720070002e:0.4472135955
legalcopyright_0031003900390035:0.4472135955
legalcopyright_004d006900630072006f0073006f0066 0074:0.4472135955
filesize_9965:1.0
PEHeaderAnomaly_False:1.0
```

In examples, the learning classifier component 104 provides the one or more feature vectors as input to a support vector machine (SVM). The SVM may then perform data analysis and pattern recognition on the one or more feature vectors. In one example the SVM, may be a linear SVM. Given a set of training examples provided by the knowledge component 102, an SVM may build a probabilistic model that indicates whether or not a file may be malicious. In another example, a hybrid approach may be elected that combines two or more individual linear SVM classifiers into a final classifier using ensemble methods. Specifically, the evaluated static data points may be subdivided into a set of families (e.g., sections, certificate, header data, and bytes sequences are used as different families). For each family, a linear SVM may be trained. The resulting classification scores generated by each linear SVM may then be combined into a final classification score using a decision tree. As an example, the decision tree may be trained using two-class logistic gradient boosting. In yet another example of feature classification evaluation, a classification may be subdivided into a three class classification problem defined by malicious files, potentially unwanted files/applications and benign files. The resulting three class problem is solved using multi-class classification (e.g., Directed Acyclic Graph (DAG) SVM) or, in case of the hybrid approach based on feature families, using a decision tree based on three-class logistic gradient boosting.

The threat detection component 106 is a component of system 100 that evaluates results of the processing performed by the learning classifier component 104 to make a determination as to whether the executable file is malicious, benign or a potentially unwanted file/application. As an example, a probabilistic value may be a final score determined from evaluating all static data points (or feature distributions) individually and determining an aggregate score that may be used for the evaluation of an executable file. In another example, correlation between static data points may be determined by the learning classification component 104 and a final score may be generated based on the correlation between static data points evaluated.

In one example, a classification as to whether a file is malicious or not may be based on comparison with a predetermined threshold value. For instance, a final score (e.g., probability value/evaluation) is determined based on feature vector processing performed by the learning classifier component 104 and compared with a probability threshold value for determining whether an executable file is malicious. As an example, a threshold value(s) may be set based on predetermined false positive range data where ranges may be set for one or more of the malicious executable files, the benign executable files and the potentially unwanted executable files. The threshold values for each of the different types may be the same or different. For instance, a threshold value may be set that indicates a confidence score in classifying an executable file as a malicious executable file. Ranges may be determined indicating how confident the system 100 is in predicting that a file is malicious. That may provide an indication of whether further evaluation of an executable file should occur. However, one skilled in the art will recognize that threshold determinations can be set in any way that be used to determine whether an executable file is malicious or not. Examples of further evaluation include but are not limited to: additional processing using a learning classifier, identification of an executable file as potentially malicious where services associated with the system 100 may follow-up, quarantining a file, and moving the file to a secure environment for execution (e.g., sandbox) among other examples. In other examples, retraining of the classifier may occur based on confidence scores. In examples, when a probability value exceeds or threshold value (or alternatively is less than a threshold value), it may be determined that an executable file may be identified as malicious. One skilled in the art will recognize that determination for predictive classification of executable files is not limited to threshold determinations. For example, any type of analytical, statistical or graphical analysis may be performed on data to classify an executable file/unknown executable file. As identified above, the threat detection component 106 may interface with the learning classifier component 104 to make a final determination as to how to classify an executable file as well as interface with the knowledge component 102 for training/retraining associated with the learning classifier.

Figure 2:
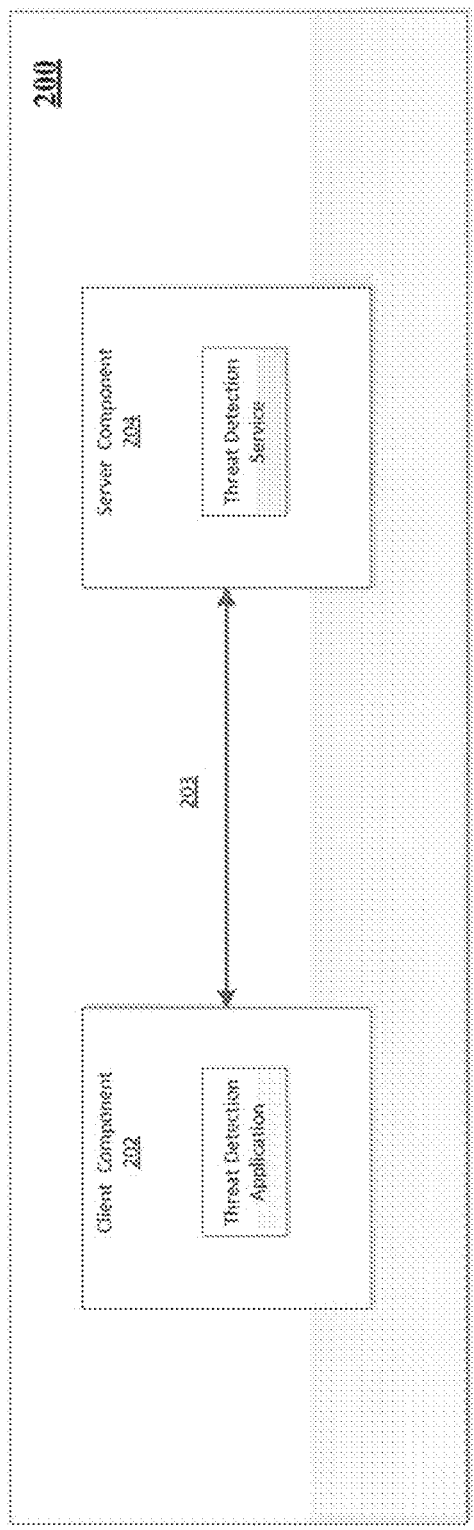
FIG. 2 illustrates an exemplary distributed system 200 showing interaction of components for implementation of exemplary threat detection as described herein.

FIG. 2 illustrates an exemplary distributed system 200 showing interaction of components for implementation of exemplary threat detection system as described herein. Where FIG. 1 illustrates an example system 100 having components (hardware or software) operating on a client, FIG. 2 illustrates an exemplary distributed system 200 comprising a client component 202 connected with at least one server component 204 via communication line 203. Communication line 203 represents the ability of the client component 202 to communicate with the server component 204, for example, to send or receive information over a network connection. That is, client component 202 and server component 204 are connectable over a network connection (e.g., a connection Internet via, for example, a wireless connection, a mobile connection, a hotspot, a broadband connection, a dial-up, a digital subscriber line, a satellite connection, an integrated services digital network, etc.).

The client component 202 may be any hardware (e.g., processing device) or software (e.g., application/service or remote connection running on a processing device) that accesses a service made available by the server component 204. The server component 204 may be any hardware or software (e.g., application or service running on a processing device) capable of communicating with the client component 202 for execution of threat detection processing (e.g., threat detection application/service). Threat detection processing may be used to evaluate a file before execution of the file as described in FIG. 1. Threat detection application or services may be present on at least one of the client component 202 and the server component 204. In other examples, applications or components (e.g., hardware or software) may be present on both the client component 202 and the server component 204 to enable processing by threat detection application/services when a network connection to the server cannot be established. In one example of system 200, client component 202 (or server component 204) may comprise one or more components for threat detection as described in system 100 including a knowledge component 102, a learning classifier component 104 and/or a threat detection component 106, as described in the description of FIG. 1. In other examples, the client component 202 may transmit data to/from the server component 204 to enable threat detections services over distributed network 200, for example as represented by communication line 203. In one example, threat detection applications/services operating on the client component 202 may receive updates from the server component 204. For instance, updates may be received by the client component 202 for re-training of a learning classifier used to evaluate an executable file on the client component 202.

Figure 3:
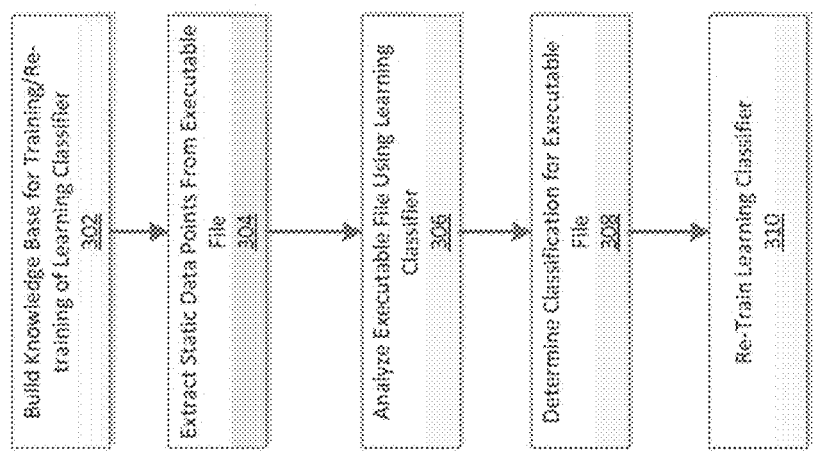
FIG. 3 illustrates an exemplary method 300 for implementation of threat detection systems and methods described herein.

FIG. 3 illustrates an exemplary method 300 for performing threat detection. As an example, method 300 may be executed by an exemplary system such as system 100 of FIG. 1 and system 200 of FIG. 2. In other examples, method 300 may be executed on a device comprising at least one processor configured to store and execute operations, programs or instructions. However, method 300 is not limited to such examples. Method 300 may be performed by any application or service that may include implementation of threat detection processing as described herein. The method 300 may be implemented using software, hardware or a combination of software and hardware.

Method 300 begins at operation 302 where a knowledge base is built for training/retraining of a learning classifier used to detect threats in executable files. Operation 302 builds the knowledge base from data collected and evaluated related to known malicious executable files, known benign executable files and potentially unwanted executable files as described in the description of FIG. 1 (e.g., knowledge component 102). The knowledge base may be used to automatically train/re-train one or more learning classifiers used to evaluate threats in executable files based on the known malicious executable files, known benign executable files and the potentially unwanted executable files. In examples, the knowledge base may be maintained on at least one of a client component and a server component, and the knowledge base may be continuously updated with information from the resources described in FIG. 1 including update information based on threat detection processing evaluation performed on unknown executable files.

When an executable file is identified for evaluation, flow proceeds to operation 304 where a one or more static data points are extracted from an executable file. In operation 304, an executable file is analyzed using machine learning processing as described with respect to the knowledge component 102 of FIG. 1 to collect/extract static data points from an executable file for evaluation. In examples, operation 304 occurs without decrypting or unpacking the executable file. However, in other examples, machine learning processing performed has the capability to evaluate static data points from extracted/unpacked content. In one example, machine learning processing is used to extract static data points from encrypted and/or compress versions of one or more files. In another example, machine learning processing is used to extract static data points from decrypted and/or unpacked versions of one or more files. In any example, extraction of static data points from different files (e.g. executable files) can be used to enhance training of a learning classifier, providing better results for extraction of static data points and classification of files.

In examples, operation 304 further comprises classifying extracted data according to a type of data extracted. For instance, the actions performed at operation 304 may be used to classify the plurality of static data points extracted into categories (categorical values) comprising numeric values, nominal values, string or byte sequences, and Boolean values, for example, as described with respect to FIG. 1. In examples, data of an executable file (e.g., binary file data) may be parsed and compared against data maintained by a threat detection application/service as described in the present disclosure to determine static data points for extraction/collection.

In operation 306, the executable file is analyzed for threats. As an example, operation 306 analyzes an executable without decrypting or unpacking the executable file. However, in other examples, the machine learning processing being performed has the capability to evaluate static data points from extracted/unpacked content. Operation 306 comprises applying a learning classifier (e.g., the learning classifier generated during performance of operation 302) to the plurality of static data points extracted from the file. As discussed, the learning classifier may be built from data comprising known malicious executable files, known benign executable files and known unwanted executable files, for example. In one example, operation 306 comprises generating at least one feature vector from the plurality of static data points extracted using the learning classifier trained by the knowledge base. In order to generate the feature vector for the learning classifier, data may be parsed and encoded for machine learning processing.

In one example, generation of the feature vector may comprise selectively setting features of the learning classifier based on the one or more of static data points extracted. Features of the generated feature vector may be weighted based on classified categories identified by the knowledge base (as described above) and the plurality of static data points extracted from the file. As an example, one or more features of the feature vector may be selectively turned on or off based on evaluation of whether a value of a static data point is within a predetermined range. However, one skilled in the art will recognize that the learning classifier can uniquely generate a feature vector for analysis of the executable file based on any data used to train/re-train the learning classifier. In examples, operation 306 further comprises evaluating the feature vector using linear or nonlinear support vector processing to determine a classification for the executable file, for example whether the executable file is harmful, benign, or unwanted.

Flow proceeds to operation 308, where a determination is made as to a classification of the executable file. For example, operation 308 makes a final determination as to whether the executable file is harmful (e.g., malicious, malware) or not based on results of the analysis of the executable file (e.g., using machine learning processing by a learning classifier). In one example, results of the analysis of an executable file may be data obtained from learning classifier, such as, for example an SVM, processing data. In one example, operation 308 further comprises preventing execution of the executable file when a probability value that the executable file is harmful exceeds a threshold value. The probability value for the executable file may be determined based on applying the learning classifier to the executable file. As an example, the threshold value may be set based on predetermined false positive range data for identifying a malicious or harmful executable file. False positive range data may be determined from the analysis/evaluation of the known malicious executable files, known benign files and potentially unwanted executable files/applications, of the knowledge base. However, as acknowledged above, determining a classification of an executable file may be based on any type of analytical, statistical or graphical analysis, or machine learning processing. In one example, ranges can be based on evaluation of data during operation of the threat detection service as well as analysis related to unknown files, for example analytics performed to evaluate unknown files.

At any point in time, operation 310 may occur where a learning classifier used for threat detection processing is re-trained. Continuously re-training of the learning classifier may ensure that the threat detection application/service is up to date and able to accurately detect new threats. As identified above, re-training may occur through results of threat detection processing including updated information added to the knowledge base. In one example, training of a learning classifier can be based on evaluation of data during operation of the threat detection service as well as analysis related to unknown files, for example analytics performed to evaluate unknown files.

Figure 4:
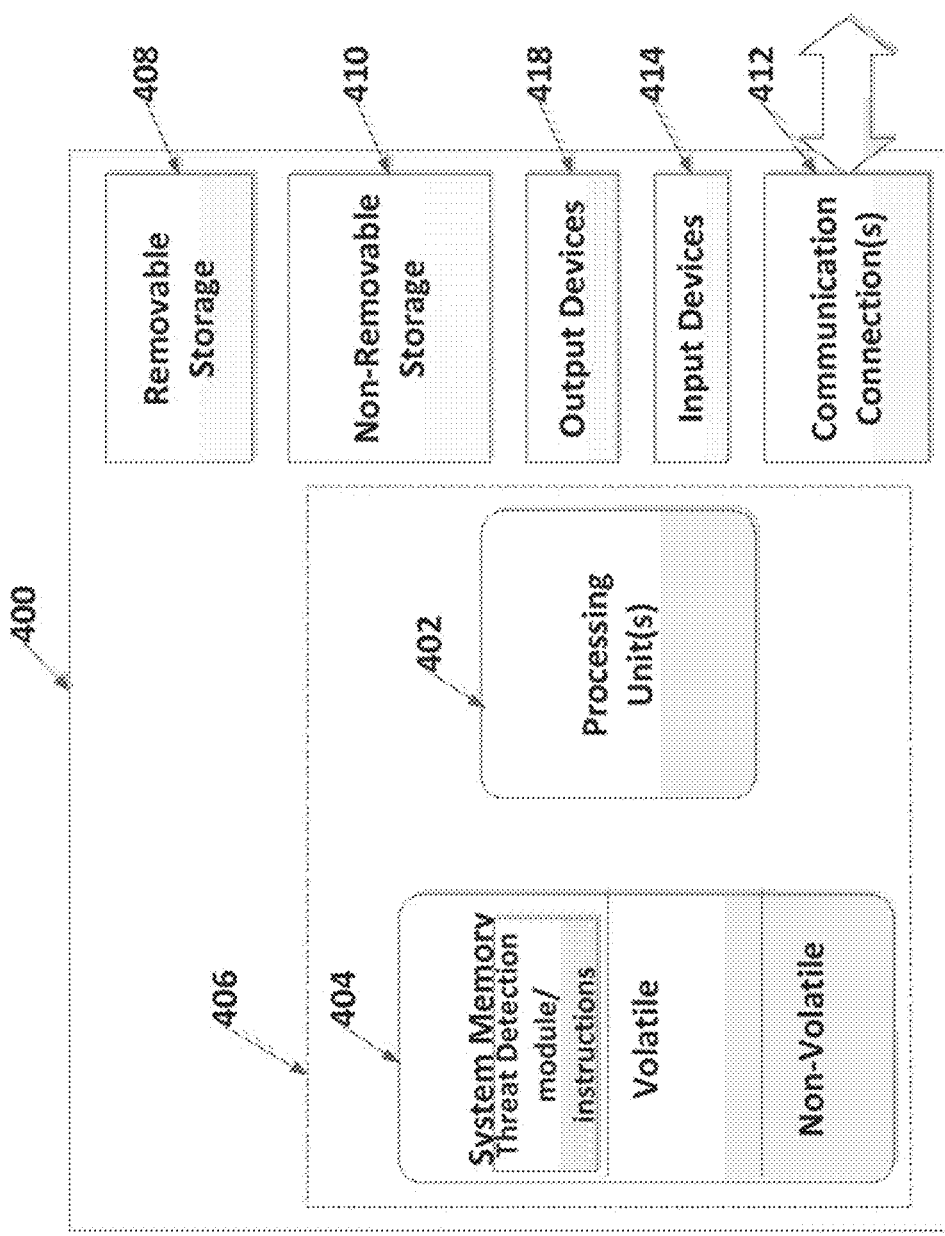
FIG. 4 illustrates one example of a suitable operating environment 400 in which one or more of the present examples may be implemented.

FIG. 4 and the additional discussion in the present specification are intended to provide a brief general description of a suitable computing environment in which the present invention and/or portions thereof may be implemented. Although not required, the embodiments described herein may be implemented as computer-executable instructions, such as by program modules, being executed by a computer, such as a client workstation or a server. Generally, program modules include routines, programs, objects, components, data structures and the like that perform particular tasks or implement particular abstract data types. Moreover, it should be appreciated that the invention and/or portions thereof may be practiced with other computer system configurations, including hand-held devices, multi-processor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

FIG. 4 illustrates one example of a suitable operating environment 400 in which one or more of the present embodiments may be implemented. This is only one example of a suitable operating environment and is not intended to suggest any limitation as to the scope of use or functionality. Other well-known computing systems, environments, and/or configurations that may be suitable for use include, but are not limited to, personal computers, server computers, hand-held or laptop devices, multiprocessor systems, microprocessor-based systems, programmable consumer electronics such as smart phones, network PCs, minicomputers, mainframe computers, distributed computing environments that include any of the above systems or devices, and the like.

In its most basic configuration, operating environment 400 typically includes at least one processing unit 402 and memory 404. Depending on the exact configuration and type of computing device, memory 404 (storing, among other things, executable evaluation module(s), e.g., malware detection applications, APIs, programs etc. and/or other components or instructions to implement or perform the system and methods disclosed herein, etc.) may be volatile (such as RAM), non-volatile (such as ROM, flash memory, etc.), or some combination of the two. This most basic configuration is illustrated in FIG. 4 by dashed line 406. Further, environment 400 may also include storage devices (removable, 408, and/or non-removable, 410) including, but not limited to, magnetic or optical disks or tape. Similarly, environment 400 may also have input device(s) 414 such as keyboard, mouse, pen, voice input, etc. and/or output device(s) 416 such as a display, speakers, printer, etc. Also included in the environment may be one or more communication connections, 412, such as LAN, WAN, point to point, etc.

Operating environment 400 typically includes at least some form of computer readable media. Computer readable media can be any available media that can be accessed by processing unit 402 or other devices comprising the operating environment. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium which can be used to store the desired information. Computer storage media does not include communication media.

Communication media embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The operating environment 400 may be a single computer operating in a networked environment using logical connections to one or more remote computers. The remote computer may be a personal computer, a server, a router, a network PC, a peer device or other common network node, and typically includes many or all of the elements described above as well as others not so mentioned. The logical connections may include any method supported by available communications media. Such networking environments are commonplace in offices, enterprise-wide computer networks, intranets and the Internet.

The different aspects described herein may be employed using software, hardware, or a combination of software and hardware to implement and perform the systems and methods disclosed herein. Although specific devices have been recited throughout the disclosure as performing specific functions, one of skill in the art will appreciate that these devices are provided for illustrative purposes, and other devices may be employed to perform the functionality disclosed herein without departing from the scope of the disclosure.

As stated above, a number of program modules and data files may be stored in the system memory 404. While executing on the processing unit 402, program modules 408 (e.g., applications, Input/Output (I/O) management, and other utilities) may perform processes including, but not limited to, one or more of the stages of the operational methods described herein such as method 300 illustrated in FIG. 3, for example.

Furthermore, examples of the invention may be practiced in an electrical circuit comprising discrete electronic elements, packaged or integrated electronic chips containing logic gates, a circuit utilizing a microprocessor, or on a single chip containing electronic elements or microprocessors. For example, examples of the invention may be practiced via a system-on-a-chip (SOC) where each or many of the components illustrated in FIG. 4 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality described herein may be operated via application-specific logic integrated with other components of the operating environment 400 on the single integrated circuit (chip). Examples of the present disclosure may also be practiced using other technologies capable of performing logical operations such as, for example, AND, OR, and NOT, including but not limited to mechanical, optical, fluidic, and quantum technologies. In addition, examples of the invention may be practiced within a general purpose computer or in any other circuits or systems.

This disclosure described some aspects of the present technology with reference to the accompanying drawings, in which only some of the possible embodiments were shown. Other aspects may, however, be embodied in many different forms and should not be construed as limited to the embodiments set forth herein. Rather, these aspects were provided so that this disclosure was thorough and complete and fully conveyed the scope of the possible embodiments to those skilled in the art.

Although specific aspects were described herein, the scope of the technology is not limited to those specific embodiments. One skilled in the art will recognize other embodiments or improvements that are within the scope and spirit of the present technology. Therefore, the specific structure, acts, or media are disclosed only as illustrative embodiments. The scope of the technology is defined by the following claims and any equivalents therein.

What is claimed is:

1. A computer-implemented method comprising:
   identifying, by a knowledge module, static data points that may be indicative of either a harmful or benign executable file;
   associating, by the knowledge module, the identified static data points with one of a plurality of categories of files, the plurality of categories of files including harmful files and benign files;
   identifying an executable file to be evaluated;
   extracting, by the knowledge module, a plurality of static data points from the identified executable file;
   generating a feature vector from the plurality of static data points using a classifier trained to classify the static data points based on training data, the training data comprising files known to fit into one of the plurality of categories of files, wherein one or more features of the feature vector are selectively turned on or off based at least in part on evaluation of whether a value of one of the plurality of static data points is within a predetermined range; and
   providing the generated feature vector to one or more support vector machines to build a probabilistic model that indicates whether the executable file fits into one of the categories of files.

2. The computer-implemented method according to claim 1, wherein the plurality of static data points are extracted without decrypting or unpacking the executable file.

3. The computer-implemented method according to claim 1, wherein the one or more support vector machines builds the probabilistic model by performing data analysis and pattern recognition on the one or more feature vectors.

4. The computer-implemented method according to claim 1, wherein the probabilistic model indicates whether the executable file is harmful.

5. The computer-implemented method according to claim 1, wherein the executable file is identified in response to a detected condition.

6. The computer-implemented method according to claim 5, wherein the detected condition is user request for a file download.

7. The computer-implemented method according to claim 5, wherein the detected condition is the detection of a new file attempting to execute.

8. The computer-implemented method according to claim 1, wherein the plurality of static data points represent predefined character strings in the executable file.

9. The computer-implemented method according to claim 1, wherein a determination of whether the executable file is harmful is used to retrain the classifier.

10. A system comprising:
    at least one memory; and
    at least one processor operatively connected with the memory and configured to perform operation of:
    identifying static data points that may be indicative of either a harmful or benign executable file;
    associating the identified static data points with one of a plurality of categories of files, the plurality of categories of files including harmful files and benign files;

identifying an executable file to be evaluated;
extracting a plurality of static data points from the identified executable file; and
generating a feature vector from the plurality of static data points using a classifier trained to classify the static data points based on training data, the training data comprising files known to fit into one of the plurality of categories of files, wherein one or more features of the feature vector are selectively turned on or off based at least in part on evaluation of whether a value of one of the plurality of static data points is within a predetermined range; and
providing the generated feature vector to one or more support vector machines to build a probabilistic model that indicates whether the executable file fits into one of the categories of files.

11. The system according to claim 10, wherein the plurality of static data points are extracted without decrypting or unpacking the executable file.

12. The system according to claim 10, wherein the one or more support vector machines builds the probabilistic model by performing data analysis and pattern recognition on the one or more feature vectors.

13. The system according to claim 10, wherein the probabilistic model indicates whether the executable file is harmful.

14. The system according to claim 10, wherein the plurality of static data points represent predefined character strings in the executable file.

15. A computer-readable storage device containing instructions, that when executed on at least one processor, causing the processor to execute a process comprising:
identifying static data points that may be indicative of either a harmful or benign executable file;
associating the identified static data points with one of a plurality of categories of files, the plurality of categories of files including harmful files and benign files;
identifying an executable file to be evaluated;
extracting a plurality of static data points from the identified executable file;
generating a feature vector from the plurality of static data points using a classifier trained to classify the static data points based on training data, the training data comprising files known to fit into one of the plurality of categories of files, wherein one or more features of the feature vector are selectively turned on or off based at least in part on evaluation of whether a value of one of the plurality of static data points is within a predetermined range; and
providing the generated feature vector to one or more support vector machines to build a probabilistic model that indicates whether the executable file fits into one of the categories of files.

16. The computer-readable storage device according to claim 15, wherein the plurality of static data points are extracted without decrypting or unpacking the executable file.

17. The computer-readable storage device according to claim 15, wherein the plurality of static data points represent predefined character strings in the executable file.

18. A computer-implemented method comprising:
identifying static data points that may be indicative of either a harmful or benign executable file;
associating the identified static data points with one of a plurality of categories of files, the plurality of categories of files including harmful files and benign files;
identifying an executable file to be evaluated;
extracting a plurality of static data points from the executable file;
generating a feature vector from the plurality of static data points using a classifier trained to classify the static data points based on training data, the training data comprising files known to fit into one of the plurality of categories of files, wherein one or more features of the feature vector are selectively turned on or off based at least in part on evaluation of whether a value of one of the plurality of static data points is within a predetermined range; and
evaluating the feature vector using a machine learning model to determine whether the executable file fits into one of the categories of files.

19. The computer-implemented method according to claim 18, wherein the plurality of static data points are extracted without decrypting or unpacking the executable file.

20. The computer-implemented method according to claim 18, wherein the machine learning model comprises an artificial neural network.

21. The computer-implemented method according to claim 18, wherein the machine learning model comprises a support vector machine.

22. The computer-implemented method according to claim 18, wherein the machine learning model comprises a machine learning decision tree.

23. The computer-implemented method according to claim 18, wherein the machine learning model comprises a Bayesian network.

24. The computer-implemented method according to claim 18, wherein evaluating the feature vector using the machine learning model comprises evaluating the feature vector using support vector processing.

25. The computer-implemented method according to claim 18, wherein the machine learning model comprises a clustering model.

26. The computer-implemented method according to claim 18, wherein the executable file is identified in response to a detected condition.

27. The computer-implemented method according to claim 26, wherein the detected condition is user request for a file download.

28. The computer-implemented method according to claim 26, wherein the detected condition is the detection of a new file attempting to execute.

29. The computer-implemented method according to claim 18, wherein the plurality of static data points represent predefined character strings in the executable file.

30. The computer-implemented method according to claim 18, wherein a determination of whether the executable file is harmful is used to retrain the classifier.

31. The computer-implemented method according to claim 18, further comprising preventing execution of the executable file based on classifying the executable file as harmful.

32. A computer-readable storage device containing instructions, that when executed on a processor, cause the processor to execute a process comprising:
identifying static data points that may be indicative of either a harmful or benign executable file;
associating the identified static data points with one of a plurality of categories of files, the plurality of categories of files including harmful files and benign files;
identifying an executable file to be evaluated;
extracting a plurality of static data points from the executable file;

generating a feature vector from the plurality of static data points using a classifier trained to classify the static data points based on training data, the training data comprising files known to fit into one of the plurality of categories of files, wherein one or more features of the feature vector are selectively turned on or off based at least in part on evaluation of whether a value of one of the plurality of static data points is within a predetermined range; and evaluating the feature vector using a machine learning model to determine whether the executable file fits into one of the categories of files.

33. The computer-readable storage device according to claim 32, wherein the plurality of static data points are extracted without decrypting or unpacking the executable file.

34. The computer-readable storage device according to claim 32, wherein the machine learning model comprises an artificial neural network.

35. The computer-readable storage device according to claim 32, wherein the machine learning model comprises a support vector machine.

36. The computer-readable storage device according to claim 32, wherein the machine learning model comprises a machine learning decision tree.

37. The computer-readable storage device according to claim 32, wherein the machine learning model comprises a Bayesian network.

38. The computer-readable storage device according to claim 32, wherein evaluating the feature vector using the machine learning model comprises evaluating the feature vector using support vector processing.

39. The computer-readable storage device according to claim 32, wherein the machine learning model comprises a clustering model.

40. The computer-readable storage device according to claim 32, wherein the executable file is identified in response to a detected condition.

41. The computer-readable storage device according to claim 40, wherein the detected condition is user request for a file download.

42. The computer-readable storage device according to claim 40, wherein the detected condition is the detection of a new file attempting to execute.

43. The computer-readable storage device according to claim 32, wherein the plurality of static data points represent predefined character strings in the executable file.

44. The computer-readable storage device according to claim 32, wherein a determination of whether the executable file is harmful is used to retrain the classifier.

45. The computer-readable storage device according to claim 32, wherein the process further comprises preventing execution of the executable file based on classifying the executable file as harmful.

46. A system comprising:
at least one memory;
at least one processor configured to perform operation of:
identifying static data points that may be indicative of either a harmful or benign executable file; and
associating the identified static data points with one of a plurality of categories of files, the plurality of categories of files including harmful files and benign files; and
at least one processor configured to perform operation of:
identifying an executable file to be evaluated;
extracting a plurality of static data points from the executable file;
generating a feature vector from the plurality of static data points using a classifier trained to classify the static data points based on training data, the training data comprising files known to fit into one of the plurality of categories of files, wherein one or more features of the feature vector are selectively turned on or off based at least in part on evaluation of whether a value of one of the plurality of static data points is within a predetermined range; and
evaluating the feature vector using a machine learning model to determine whether the executable file fits into one of the categories of files.

47. The system according to claim 46, wherein the plurality of static data points are extracted without decrypting or unpacking the executable file.

48. The system according to claim 46, wherein the machine learning model comprises an artificial neural network.

49. The system according to claim 46, wherein the machine learning model comprises a support vector machine.

50. The system according to claim 46, wherein the machine learning model comprises a machine learning decision tree.

51. The system according to claim 46, wherein the machine learning model comprises a Bayesian network.

52. The system according to claim 46, wherein evaluating the feature vector using the machine learning model comprises evaluating the feature vector using support vector processing.

53. The system according to claim 46, wherein the machine learning model comprises a clustering model.

54. The system according to claim 46, wherein the executable file is identified in response to a detected condition.

55. The system according to claim 54, wherein the detected condition is user request for a file download.

56. The system according to claim 54, wherein the detected condition is the detection of a new file attempting to execute.

57. The system according to claim 46, wherein the plurality of static data points represent predefined character strings in the executable file.

58. The system according to claim 46, wherein a determination of whether the executable file is harmful is used to retrain the classifier.

59. The system according to claim 46, further comprising at least one processor configured to perform operation of:
preventing execution of the executable file based on classifying the executable file as harmful.

* * * * *